(12) United States Patent
Ziegenfuss (10) Patent No.: US 7,958,716 B2
(45) Date of Patent: Jun. 14, 2011

(54) GAS PRODUCTION WELL SECONDARY PURPOSE TURBINE ELECTRIC POWER GENERATOR SYSTEM

(76) Inventor: Mark R. Ziegenfuss, Ringoes, NJ (US)

( * ) Notice: Subject to any disclaimer, the term of this patent is extended or adjusted under 35 U.S.C. 154(b) by 960 days.

(21) Appl. No.: 11/731,079

(22) Filed: Mar. 30, 2007

(65) Prior Publication Data
US 2008/0238101 A1    Oct. 2, 2008

(51) Int. Cl.
*F02C 3/22* (2006.01)
(52) U.S. Cl. .................... 60/39.465; 166/75.11
(58) Field of Classification Search ............... 60/39.465; 166/75.11
See application file for complete search history.

(56) References Cited

U.S. PATENT DOCUMENTS

| | | | |
|---|---|---|---|
| 3,742,716 A | 7/1973 | Backstrom | |
| 4,962,784 A * | 10/1990 | Collins | 137/15.03 |
| 6,829,911 B2 | 12/2004 | Carver et al. | |
| 6,901,735 B2 * | 6/2005 | Lohn | 60/39.465 |

* cited by examiner

*Primary Examiner* — Michael Cuff
*Assistant Examiner* — Vikansha S Dwivedi
(74) *Attorney, Agent, or Firm* — Kenneth P. Glynn, Esq.; Deirdra M. Meagher, Esq.

(57) ABSTRACT

A natural gas production well secondary purpose turbine electric power generator system includes: a.) a natural gas production well from an underground or underwater natural gas well production field that produces natural gas at the surface at an elevated pressure of at least 500 psi and at least 200 psi in excess of desired pressure delivered to gas processing or gas distribution lines; b.) a natural gas valving subsystem connected to said well; and, c.) a power generating turbine subsystem, including at least one gas driven turbine located in at least one of said well and said gas valving subsystem.

20 Claims, 7 Drawing Sheets

GAS PRODUCTION WELL SECONDARY PURPOSE TURBINE ELECTRIC POWER GENERATOR SYSTEM

BACKGROUND OF INVENTION a. Field of Invention

The invention relates generally to relates generally to the secondary use of natural gas supply flow from natural gas wells to generate electricity using gas driven turbines. This invention is particularly applicable to both new projects and to retrofit of gas supply systems directly from natural gas wells.

b. Description of Related Art

The following patents are representative of systems with turbine generation with synthetic or gas storage systems:

U.S. Pat. No. 6,826,911 B2 to Carver et al. describes a fluid storage facility which includes an arrangement for transferring liquefied propane or butane from a supply source of a pipeline or at least one delivery vehicle to at least one pumping station via at least one weighing station, the pumping station transferring the liquefied propane or butane to at least one storage vessel, the at least one storage vessel being secured within a tunnel that is one of a railroad tunnel, a highway tunnel, an aqueduct tunnel or other transportation tunnel, the tunnel passing through the earth, and including an entrance at both ends, each of which is directly connected and directly accessible at ground level, and being configured to contain the at least one storage vessel for the storage of liquefied propane or butane.

U.S. Pat. No. 3,742,716 to Backstrom describes a method of storing gas under pressure in a reservoir which comprises applying a pressure of the gas in the reservoir to a surface of a body of liquid outside the reservoir so as to resist leakage of gas from the reservoir. The reservoir may be constituted by an underground cavity, a cavity near the ground or by a container within such a cavity. In one application use is made of a second cavity above the reservoir and a connection from the reservoir opening into the second cavity above an intermediate level, liquid being supplied to the second cavity up to the intermediate level. In another application the reservoir acts as the storage chamber of a compressed air power storage system connected to a water supply. In a third application especially intended for LPG or LNG the reservoir is constituted by a container within a cavity near or below the earth, the container having walls which are separated from the sides of the cavity by a space, the method including introducing a body of liquid comprising a material remaining plastic or liquid at the temperature of the gas to the said space. Also disclosed is an apparatus for storing gas under pressure.

Notwithstanding the prior art, the present invention is neither taught nor rendered obvious thereby.

SUMMARY OF INVENTION

The present invention is natural gas production well secondary purpose turbine electric power generator system that includes: a.) a natural gas production well from an underground or underwater natural gas well production field that produces natural gas at the surface at an elevated pressure of at least 500 psi and at least 200 psi in excess of desired pressure delivered to gas processing or gas distribution lines; b.) a natural gas valving subsystem connected to said well; and, c.) a power generating turbine subsystem, including at least one gas driven turbine located in at least one of said well and said gas valving subsystem. By "valving subsystem" is meant all of the piping, valves, controls and connected equipment and piping upstream from the well head. It would typically include any brakes, reducers and valves relating to control of the gas from the production well, as well as any normal downstream piping and components.

In some preferred embodiments of the present invention natural gas production well secondary purpose turbine electric power generator system, the gas pressure within said well at the surface is at least 800 psi. In some preferred embodiments of the present invention, the gas pressure within said well at the surface is in excess of 400 psi.

In some preferred embodiments of the present invention natural gas production well secondary purpose turbine electric power generator system, the gas pressure downstream from at least one turbine is less than 150 psi.

In some preferred embodiments of the present invention natural gas production well secondary purpose turbine electric power generator system, the at least one gas driven turbine is located downstream from said at least one safety valve in said gas valving subsystem.

In some preferred embodiments of the present invention natural gas production well secondary purpose turbine electric power generator system, the power generating turbine subsystem includes at least one gas driven turbine located in said well or in both said well and in said gas valving subsystems.

In some preferred embodiments of the present invention natural gas production well secondary purpose turbine electric power generator system, the at least one gas driven turbine includes a dedicated upstream inlet valve.

In some preferred embodiments of the present invention natural gas production well secondary purpose turbine electric power generator system, the system further includes a computerized monitoring and control system that includes pressure sensors located within said gas valving subsystem and is programmed to automatically valve down gas flow in response to sensing a gas pressure that exceeds a predetermined threshold pressure. In some preferred embodiments of the present invention natural gas production well secondary purpose turbine electric power generator system, the computerized monitoring and control system includes at least one sensor downstream from each of said at least one turbine and includes at least one sensor upstream from each of said at least one turbine.

In some preferred embodiments of the present invention natural gas production well secondary purpose turbine electric power generator system, the gas valving subsystems include at least one master breaking valve downstream from each of said at least one turbine.

While the present invention has been described above with at least one power generating gas driven turbine, in many embodiments, more than one such turbine is employed. Thus, in some preferred embodiments of the present invention natural gas production well secondary purpose turbine electric power generator system, the system includes: a.) a natural gas production well from an underground or underwater natural gas well production field that produces natural gas at the surface at an elevated pressure of at least 500 psi and at least 200 psi in excess of desired pressure delivered to gas processing or gas distribution lines; b.) a natural gas valving subsystem connected to said well; and, c.) a power generating turbine subsystem, including a plurality of gas driven turbines located in at least one of said well and said gas valving subsystem. All of the features described above in this Summary section pertaining to at least one turbine types systems also applies to these systems with a plurality of turbines.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention and are incorporated in and constitute a part of this specification, illustrate preferred embodiments of the invention and together with the detail description serve to explain the principles of the invention. In the drawings.

DETAILED DESCRIPTION OF THE EMBODIMENTS

Figure 1:
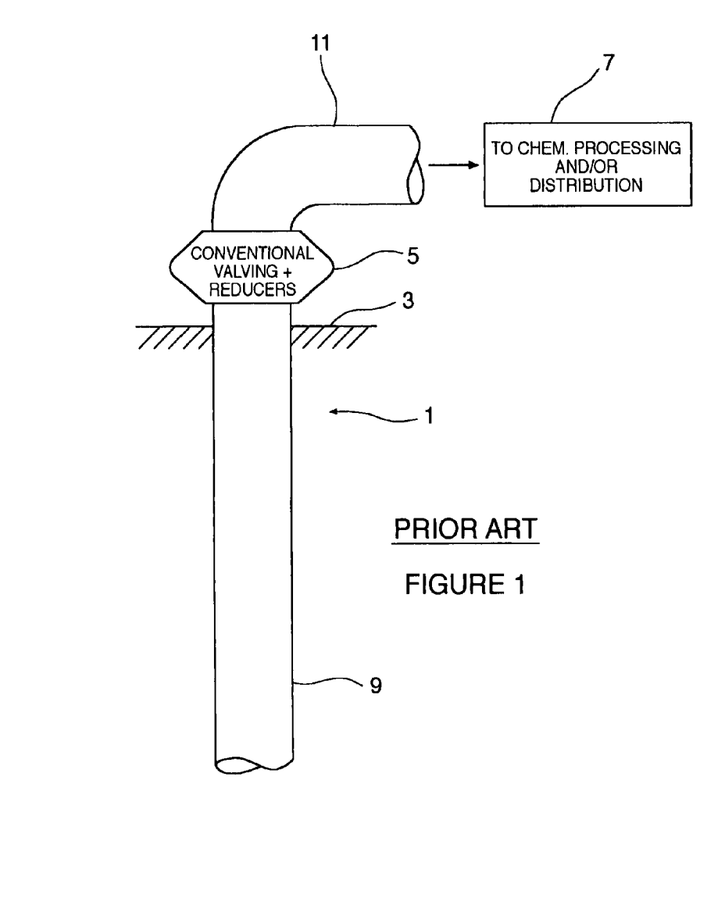
FIG. 1 shows a simple diagrammatic representation of a prior art production gas well.

Referring now to the drawings, in FIG. 1 there is shown a diagrammatic representation of a prior art production gas well system 1. It is shown in simple format, as the details of capping, pressure reduction and piping are well known and well conventionalized in this industry. This well system 1 is under ground 3, and has a riser pipe 9 that takes the gas from the well at extremely high pressures, e.g., sometimes (in good, productive wells) in excess of 1000 or 2000 psi. Conventional cap breaking valves and pressure reducers 5 are employed to ensure that the pressure is reduced to acceptable lower levels for transmission through distribution and/or chemical processing plants 7. While these systems generate natural gas for fuel and for chemical production, the energy from the extreme well pressures is lost or wasted through the pressure reduction mechanisms currently used. The present invention is directed to capturing this energy for driving electricity generating turbines.

Figure 2:
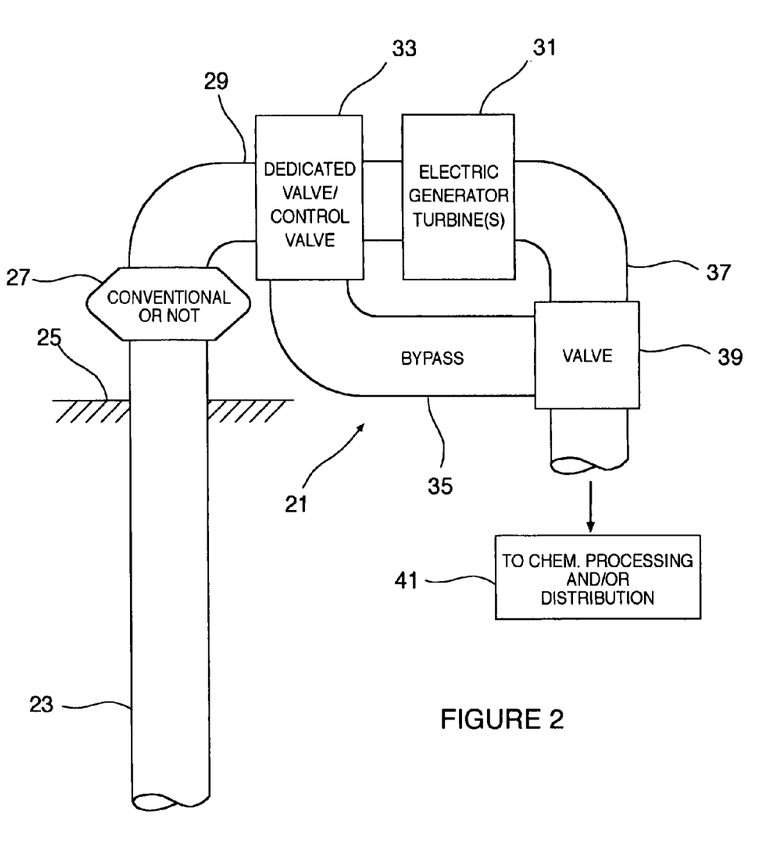
FIGS. 2, 3, 4 and 5 illustrate stylized block diagrams of some preferred embodiments of the present invention, namely, the installation of one or more turbine generators at the surface of the natural gas production wells at the valving subsystem.

FIGS. 2, 3, 4 and 5 illustrate stylized block diagrams of some preferred embodiments of the present invention, namely, the installation of one or more turbine generators at the surface of the natural gas production wells at the valving subsystem or in the well. Thus, FIG. 2 shows a present invention system 21 that includes a production gas well with riser well line 23 from the well from ground 25 with or without conventional valving and reducers 27. (Conventional arrangements may be used with the present invention turbines and valves and bypasses or not. For example, in the case of retrofitting existing wells with the present invention electricity generating turbines, it would be easier, more cost effective and add redundant braking capabilities. Also, in situations where bypassing systems are included, the reducers could be at the bypass or back in the conventional location upstream from the bypass.) In FIG. 2, valving subsystem pipe 29 has a dedicated shut down valve 33 that is also a control valve when a bypass 35 is included to keep gas flow intact during turbine repairs or maintenance. The bypass is usually shut down, except as needed and gas flows through pipe 29 and valve 33 into turbines 31. The turbine(s) 31 reduce pressure by taking energy from the pressurized gas to turn the turbines and run the generators to generate electric power, thereby converting pressure to mechanical energy and slowing down (reducing the pressure) of the gas. Additionally reducers and/or valves, such as valve 39, may be used to regulate, control or shut down the gas flow as it is delivered to chemical processing and/or distribution to gas retailers and end users.

Figure 3:
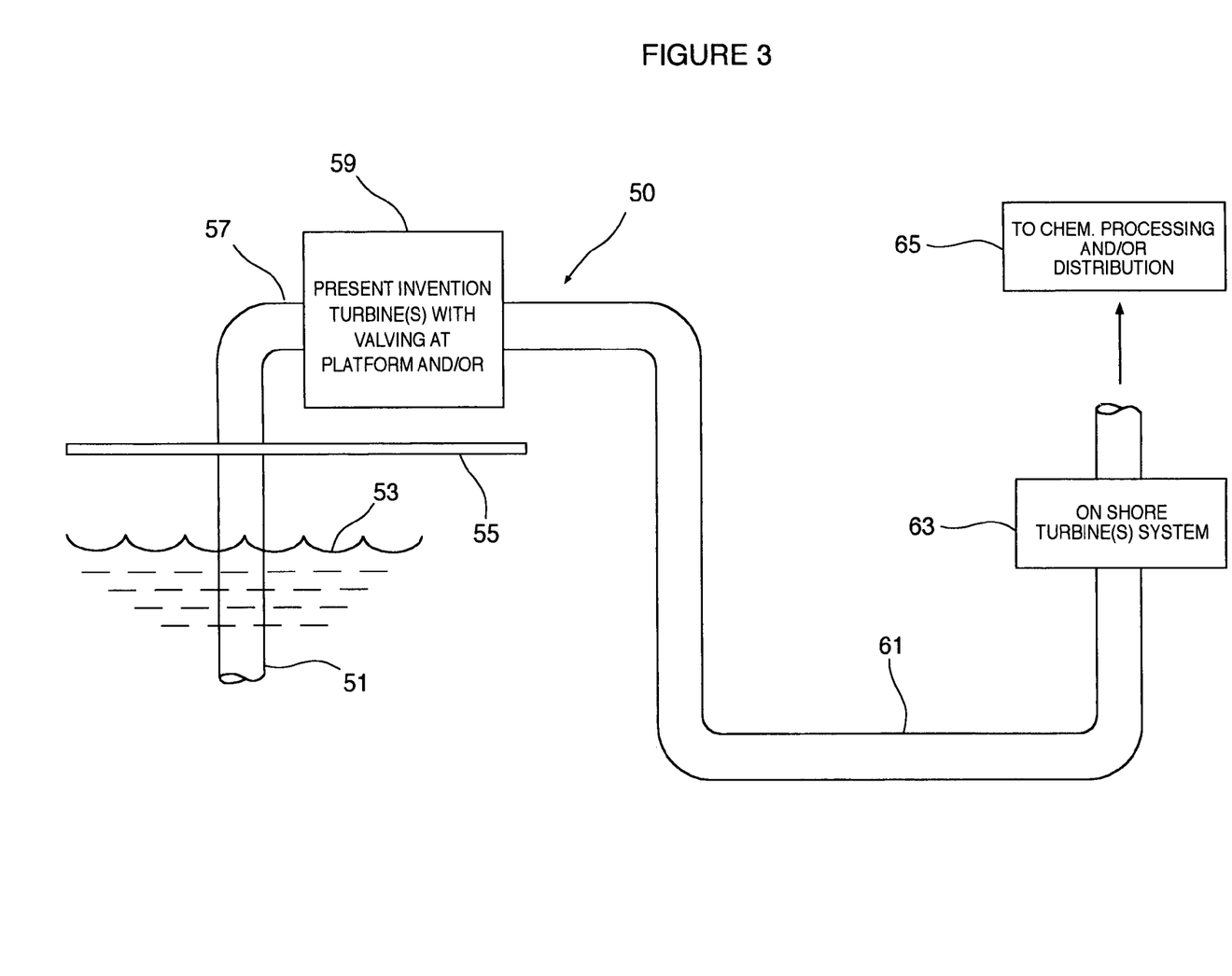

FIG. 3 shows an offshore gas drilling system 50 with platform to shore piping for onshore delivery. In FIG. 3, gas line 51 exits water 53 to platform 55. Valving subsystem pipe 57 has a present invention turbine system 59 with valving subsystem at the platform, such as a dedicated shut down valve that may also be a control valve when a bypass is included to keep gas flow intact during turbine repairs or maintenance. The bypass is usually shut down, except as needed and gas flows through pipe 57 into turbine(s) 59. The turbine(s) 59 reduce pressure by taking energy from the pressurized gas to turn the turbines and run the generators to generate electric power, thereby converting pressure to mechanical energy and slowing down (reducing the pressure) of the gas. Additionally reducers and/or valves may be used to regulate, control or shut down the gas flow as it is delivered to chemical processing and/or distribution to gas retailers and end users. The gas flows through pipe 61 to shore and a first or second turbine system onshore in addition to or in place of turbine(s) 59 may be included. The reduced pressure gas then flows to processing and/or distribution 65.

Figure 4:
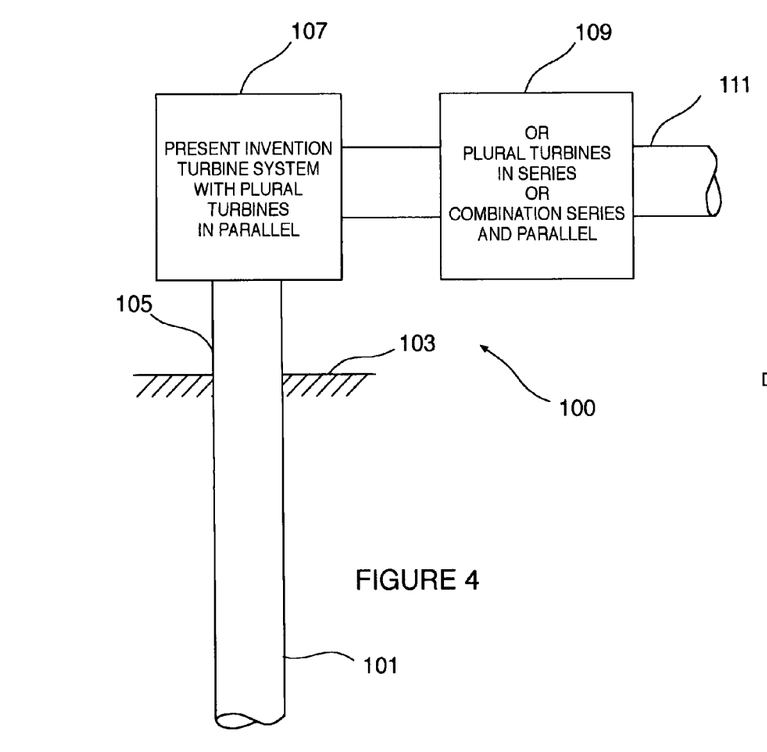

FIG. 4 illustrates in simple diagrammatic format some of the options of the present invention systems. Thus, system 100 includes a natural gas production ground well 101. Above ground 103 is a valving subsystem pipe 105, with a present invention turbine system with plural turbines 107 arranged in parallel, or plural turbines 109 arranged in series, or a combination of both series and parallel arrangements.

Figure 5:
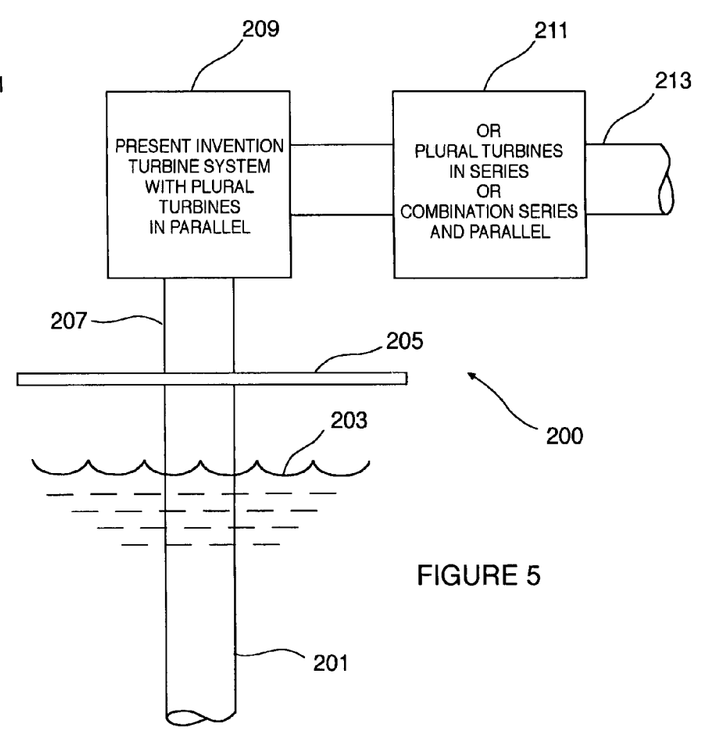

FIG. 5 illustrates in simple diagrammatic format some of the alternative options of the present invention systems in addition to what is shown in FIG. 4 above. Thus, system 200 includes a natural gas production offshore well 201. Above water 203 is a platform 205 with a valving subsystem pipe 207, with present invention turbine system plural turbines 209 arranged in parallel, or plural turbines 211 arranged in series, or a combination of both series and parallel arrangements.

Figure 6:
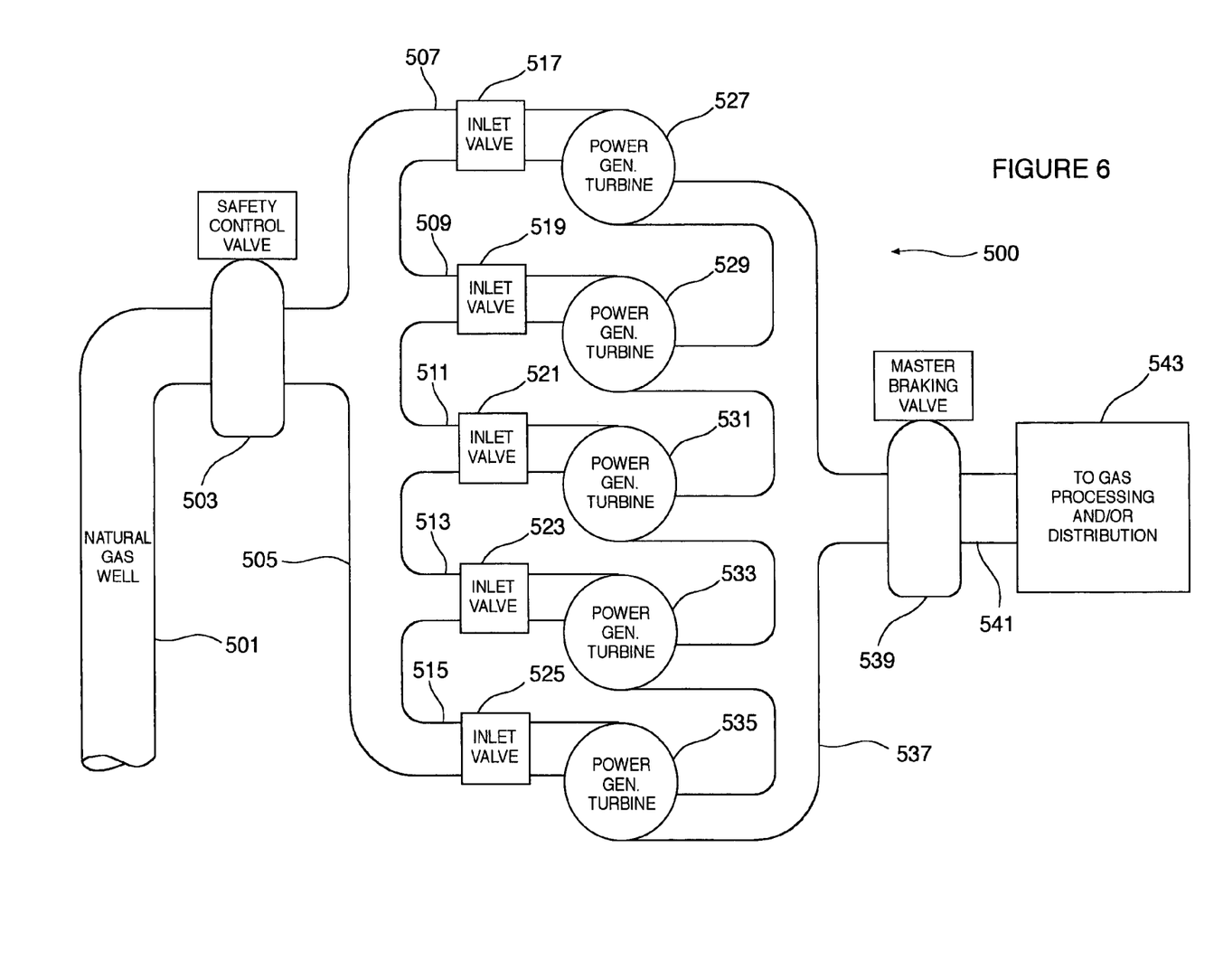
FIG. 6 illustrates a parallel group of turbine generators with manifold system from a single production well pipe.

FIG. 6 illustrates a parallel group of turbine generators with manifold system off a single riser conduit in accordance with one preferred embodiment of the present invention. Riser conduit 501 is illustrated in pipe form and is typically a drilled vertical or slant well hole from the surface to the natural gas field or pocket. There is a safety control valve 503 that is a master shut-off as well as a breaking valve upstream from the turbines. Manifold 505 has distributor lines 507, 509, 511, 513 and 525, as shown. These lines are connected to turbines 527, 529, 531, 533 and 535, respectively, each with dedicated inlet valves, namely, valves 517, 519, 521, 523 and 525, respectively to permit any one or combination of lines to be shut down or slowed down without the need to shut down the other lines. The outlet side of the manifold could distribute to separate gas lines or recombined at manifold 537 to main pipe 541. Pipe 541 includes a master braking valve 539 and is connected for distribution to gas consumers 543, as shown.

Figure 7:
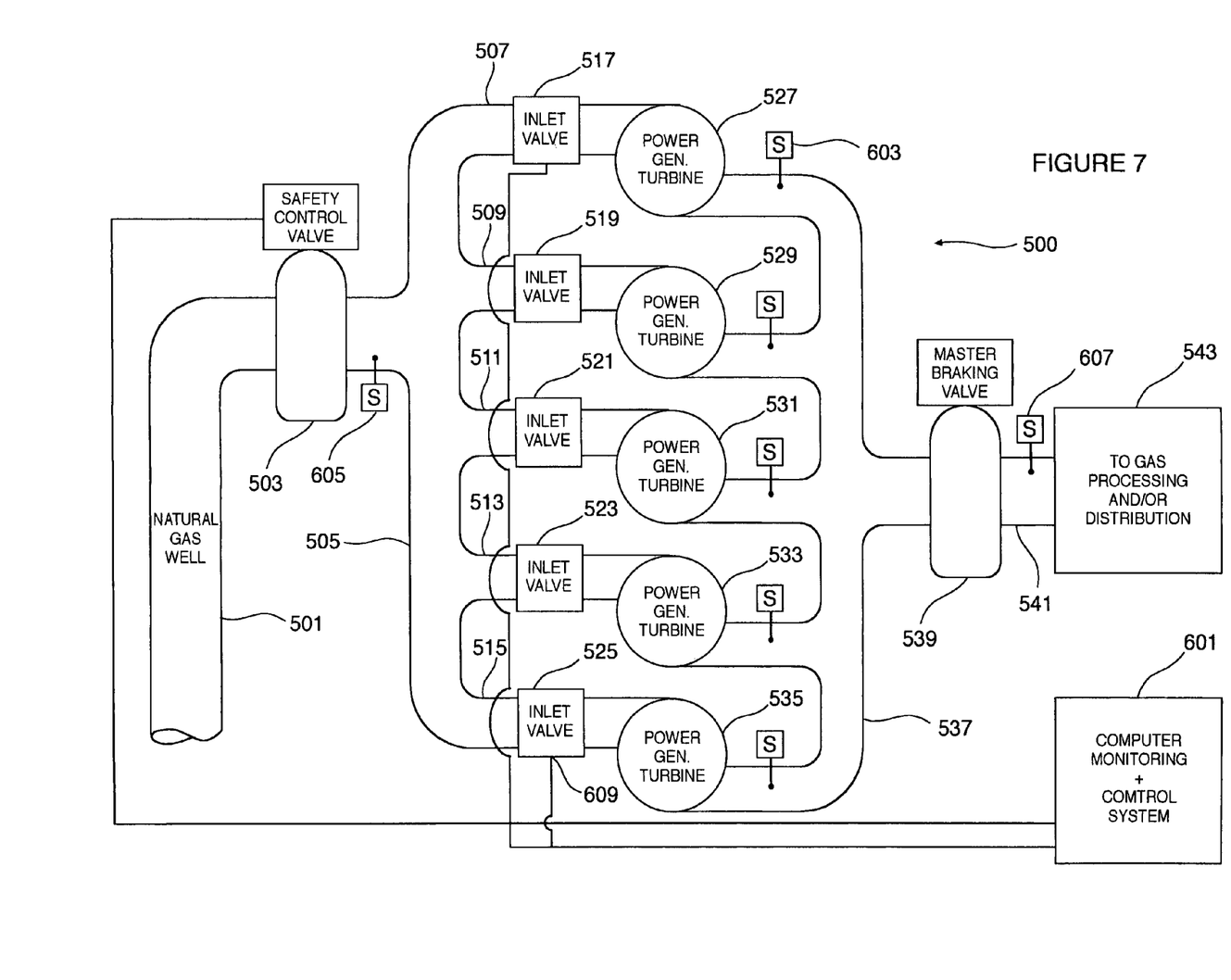
FIG. 7 illustrates the parallel group of turbine generators with manifold system from as shown in FIG. 6, but with a computerized monitoring and control system strategically connected to it; and, FIG. 8 illustrates an alternative arrangements with turbines aligned in series in the valving subsystem.

FIG. 7 illustrates the parallel group of turbine generators with manifold system from a single gas production riser conduit shown in FIG. 6, with identical components identically numbered, but with a computerized monitoring and control system 601 strategically connected to it. System 201 has wireless sensors such as main line sensor 605, individual line sensors, such as sensor 603, and outlet main pipe sensor 607. These sensors send continual signals to system 601 and its computer compares the actual data received with preset ranges. When deviations within a certain range from the desired first range as recognized, automatic valving occurs through connections and drives such as drive 609. When deviations are greater a line or system shutdown may occur and alarms or signals to alive monitoring person will be sent. In this manner, if a turbine breaks down or locks up or becomes jammed or bearings wear, the automatic control and monitoring system will prevent further damage and limit pressure spikes.

Figure 8:
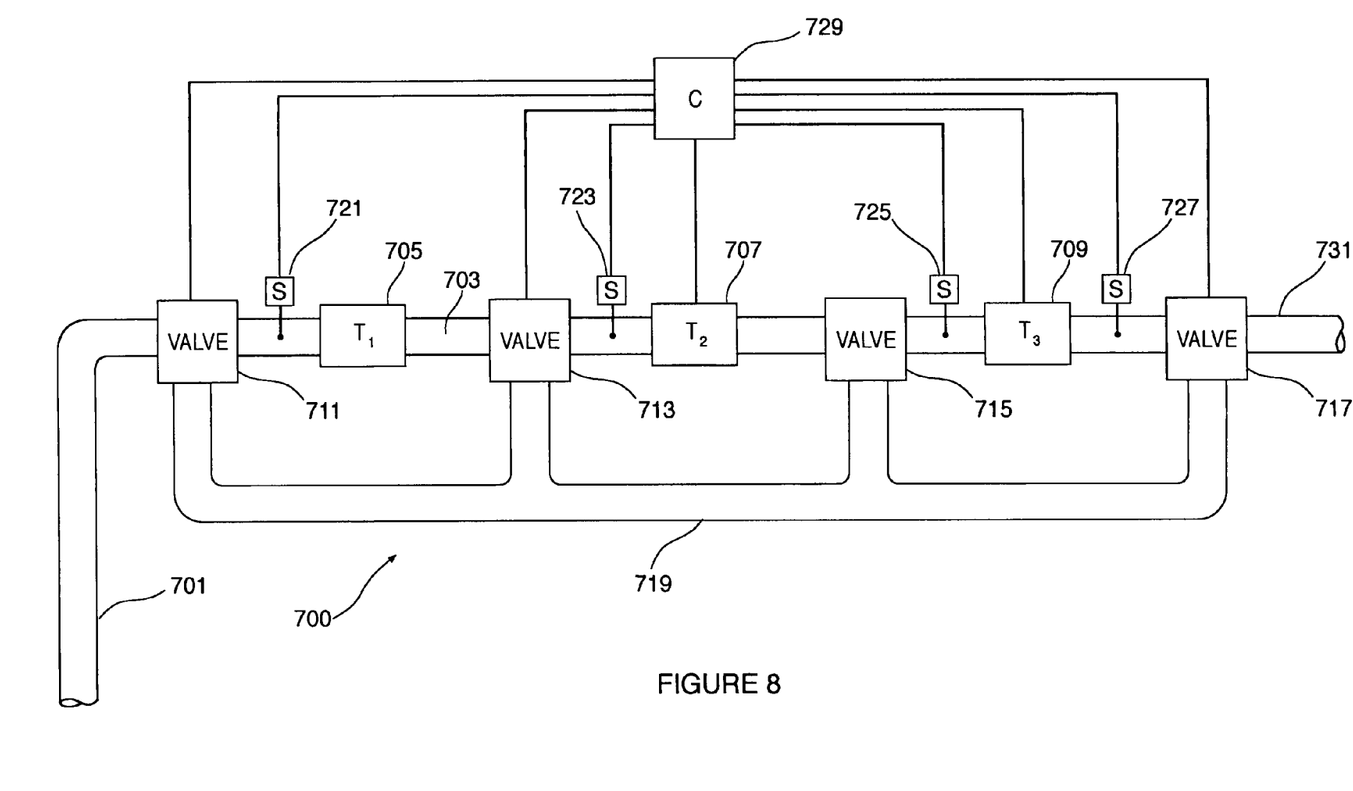

FIG. 8 illustrates an alternative arrangement present invention natural gas supply and electricity generating system 700 with turbines 705, 707 and 709 aligned in series in valving subsystem main line 703 that is taken off gas production riser conduit 701. There is a bypass line 719 and multipositional valves connected thereto in series. Hence, valve 711 is upstream from all components and controls flow to all of the turbines or some or just turbine 705, depending upon the position of the other downstream valves. Valve 713 controls downstream from its position before turbine 707 and, likewise, valve 715 controls downstream from its position before turbine 709. Valve 717 may stop all flow, permit flow only through main line 703, or only through bypass 719, or some combination of both and may control the flow rates in each possible scenario. The gas exits into the central distribution system at exit 713. Control and monitoring computer 729 is connected to sensors 721, 723, 725 and 727, positioned as shown, and is also connected to each of the aforesaid valves. When sensors recognize deviations from preset standards, preprogrammed action is automatically taken. Computer manual override is included wherein an operator may input override commands.

Figure 9:
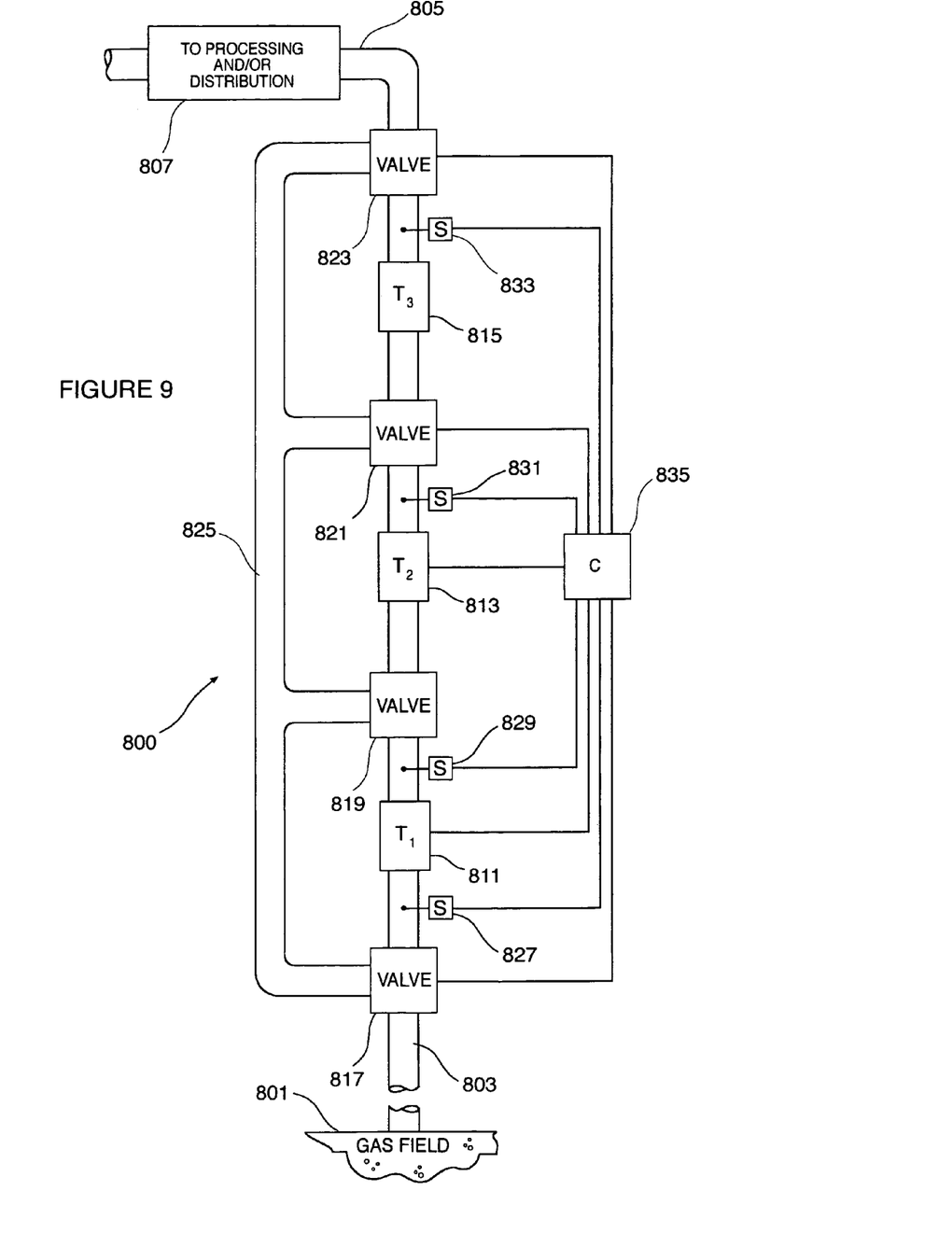

FIG. 9 illustrates another alternative arrangement present invention gas production system 800 with turbines 811, 813 and 815 aligned in series in the gas production well riser conduit 803 that is taken off the gas field. There is a bypass line 825 and multipositional valves connected thereto in series. Hence, valve 817 is upstream from all components and controls flow to all of the turbines or some or just turbine 811, depending upon the position of the other downstream valves; Valve 819 controls downstream from its position before turbine 813 and, likewise, valve 821 controls downstream from its position before turbine 815. Valve 823 may stop all flow, permit flow only through riser conduit 803, or only through bypass 825, or some combination of both and may control the flow rates in each possible scenario. The gas exits into the central gas distribution system at exit 805. Control and monitoring computer 835 is connected to sensors 827, 829, 831 and 833, positioned as shown, and is also connected to each of the aforesaid valves. When sensors recognize deviations from preset standards, preprogrammed action is automatically taken. Computer manual override is included wherein an operator may input override commands. The turbines generate electricity for either government, public utility resale or both.

Although particular embodiments of the invention have been described in detail herein with reference to the accompanying drawings, it is to be understood that the invention is not limited to those particular embodiments, and that various changes and modifications may be effected therein by one skilled in the art without departing from the scope or spirit of the invention as defined in the appended claims.

What is claimed is:

1. A natural gas production well secondary purpose turbine electric power generator system which comprises:
   a.) a natural gas production well directly connected to an underground or underwater natural gas well production field that produces natural gas at the surface at an elevated pressure of at least 500 psi and at least 200 psi in excess of desired pressure delivered to gas processing or gas distribution lines, said well having a riser pipe that takes natural gas from the well, and having a valving subsystem pipe extending directly from said riser pipe to deliver said natural gas through a natural gas valving subsystem located therein;
   b.) said natural gas valving subsystem directly connected to and in said valving subsystem pipe downstream of said well; and,
   c.) a power generating turbine subsystem, said power generating turbine subsystem including at least one gas driven turbine located in said valving subsystem pipe at a location adjacent said natural gas valving subsystem.

2. The natural gas production well secondary purpose turbine electric power generator system of claim 1 wherein said gas pressure within said well riser pipe is at least 800 psi.

3. The natural gas production well secondary purpose turbine electric power generator system of claim 1 wherein said gas pressure within said well riser pipe is in excess of 400 psi.

4. The natural gas production well secondary purpose turbine electric power generator system of claim 1 wherein said gas pressure downstream from at least one turbine is less than 150 psi.

5. The natural gas production well secondary purpose turbine electric power generator system of claim 1 wherein said gas valving subsystem includes at least one safety valve and said at least one gas driven turbine is located downstream from said at least one safety valve in said gas valving subsystem.

6. The natural gas production well secondary purpose turbine electric power generator system of claim 1 wherein said power generating turbine subsystem includes at least two gas driven turbines located adjacent said gas valving subsystems.

7. The natural gas production well secondary purpose turbine electric power generator system of claim 1 wherein each of said at least one gas driven turbine includes a dedicated upstream inlet valve.

8. The natural gas production well secondary purpose turbine electric power generator system of claim 1 wherein said system further includes a computerized monitoring and control system that includes at least one pressure sensor located within said gas valving subsystem and is programmed to automatically valve down gas flow in response to sensing a gas pressure that exceeds a predetermined threshold pressure.

9. The natural gas production well secondary purpose turbine electric power generator system of claim 8 wherein said computerized monitoring and control system includes at least one sensor downstream from each of said at least one turbine and includes at least one sensor upstream from each of said at least one turbine.

10. The natural gas production well secondary purpose turbine electric power generator system of claim 1 wherein said gas valving subsystem includes at least one master breaking valve downstream from each of said at least one turbine.

11. A natural gas production well secondary purpose turbine electric power generator system which comprises:
   a.) a natural gas production well directly connected to an underground or underwater natural gas well production field that produces natural gas at the surface at an elevated pressure of at least 500 psi and at least 200 psi in excess of desired pressure delivered to gas processing or gas distribution lines, said well having a riser pipe that takes natural gas from the well, and having a valving subsystem pipe extending directly from said riser pipe to deliver said natural gas through a natural gas valving subsystem located therein;

b.) said natural gas valving subsystem directly connected to and in said valving subsystem pipe downstream of said well; and, c.) a power generating turbine subsystem, said power generating turbine subsystem including at least one gas driven turbine located in said valving subsystem pipe at a location within said natural gas valving subsystem.

12. The natural gas production well secondary purpose turbine electric power generator system of claim 11 wherein said gas pressure within said well riser pipe is at least 800 psi.

13. The natural gas production well secondary purpose turbine electric power generator system of claim 11 wherein said gas pressure within said well riser pipe is in excess of 400 psi.

14. The natural gas production well secondary purpose turbine electric power generator system of claim 11 wherein said gas pressure downstream from at least one turbine is less than 150 psi.

15. The natural gas production well secondary purpose turbine electric power generator system of claim 11 wherein said gas valving subsystem includes at least one safety valve and said at least one gas driven turbine is located downstream from said at least one safety valve in said gas valving subsystem.

16. The natural gas production well secondary purpose turbine electric power generator system of claim 11 wherein said power generating turbine subsystem includes at least one gas driven turbine located adjacent said gas valving subsystems.

17. The natural gas production well secondary purpose turbine electric power generator system of claim 11 wherein each of said at least one gas driven turbine includes a dedicated upstream inlet valve.

18. The natural gas production well secondary purpose turbine electric power generator system of claim 11 wherein said system further includes a computerized monitoring and control system that includes at least one pressure sensor located within said gas valving subsystem and is programmed to automatically valve down gas flow in response to sensing a gas pressure that exceeds a predetermined threshold pressure.

19. The natural gas production well secondary purpose turbine electric power generator system of claim 18 wherein said computerized monitoring and control system includes at least one sensor downstream from each of said at least one turbine and includes at least one sensor upstream from each of said at least one turbine.

20. The natural gas production well secondary purpose turbine electric power generator system of claim 11 wherein said gas valving subsystem includes at least one master breaking valve downstream from each of said at least one turbine.

* * * * *